US009400565B2

(12) United States Patent
Chiu

(10) Patent No.: US 9,400,565 B2
(45) Date of Patent: Jul. 26, 2016

(54) KEYBOARD WITH SENSING SWITCH FUNCTION

(71) Applicant: Jye Wang Enterprise Co., Ltd., New Taipei (TW)

(72) Inventor: Hsueh-Ling Chiu, New Taipei (TW)

(73) Assignee: JYE WANG ENTERPRISE CO., LTD., New Taipei (TW)

( * ) Notice: Subject to any disclaimer, the term of this patent is extended or adjusted under 35 U.S.C. 154(b) by 73 days.

(21) Appl. No.: 14/583,787

(22) Filed: Dec. 29, 2014

(65) Prior Publication Data

US 2016/0187999 A1 Jun. 30, 2016

(51) Int. Cl.
*G06F 3/023* (2006.01)
*G06F 3/02* (2006.01)

(52) U.S. Cl.
CPC ............ *G06F 3/0231* (2013.01); *G06F 3/0219* (2013.01)

(58) Field of Classification Search
CPC .............................. G06F 3/0231; G06F 3/0219
USPC ......................................................... 345/168
See application file for complete search history.

(56) References Cited

U.S. PATENT DOCUMENTS

| 4,713,535 | A | * | 12/1987 | Rhoades | A61F 4/00 250/221 |
| 4,779,079 | A | * | 10/1988 | Hauck | G06F 3/0227 345/156 |
| 5,861,822 | A | * | 1/1999 | Park | G06F 3/0231 341/176 |
| 6,091,404 | A | * | 7/2000 | Hong | G06F 1/1616 345/156 |
| 6,453,027 | B1 | * | 9/2002 | Kang | G06F 3/021 341/22 |
| 8,253,530 | B2 | * | 8/2012 | Zhou | H03K 17/9618 200/344 |
| 2001/0013859 | A1 | * | 8/2001 | Roylance | G06F 3/0219 345/168 |
| 2002/0024504 | A1 | * | 2/2002 | Kao | G06F 3/023 345/168 |
| 2012/0317329 | A1 | * | 12/2012 | Hsieh | G06F 3/0219 710/316 |

\* cited by examiner

*Primary Examiner* — Tom Sheng
(74) *Attorney, Agent, or Firm* — Leong C. Lei

(57) ABSTRACT

A keyboard with a sensing switch function includes a press key module provided for a user to input a keyboard signal, a micro control unit electrically coupled to the press key module for receiving a switching signal to determine the output priority of each output port and deliver the keyboard signal, and plural output ports for transmitting the keyboard signal via a cable or wireless transmission. The keyboard also includes a sensing module with plural light sensors for sensing a change of light to generate a switching signal, and a display module with plural indicating lamps having a quantity equal to the quantity of the output ports, and the indicating lamps are switched according to the output mode. After obtaining the output priority, the output port outputs the keyboard signal to an external device.

13 Claims, 5 Drawing Sheets

KEYBOARD WITH SENSING SWITCH FUNCTION

BACKGROUND OF THE INVENTION

1. Field of the Invention

The present invention relates to a keyboard with a sensing switch function, and more particularly to a keyboard capable of switching the mode of outputting signals through a sensing module.

2. Description of the Related Art

Keyboard plays a very important role in communications between people and technology, and most computers and other digital devices use the keyboard as an interface for communications, and the application of the keyboard comes with different ways of connections as science and technology advance.

The connection between keyboard and computer is developed from the early-stage RS-232/DB-9 communication interface standard to PS/2 communication interface and finally to the present USB communication interface with high compatibility. Most connections are cable connection, but the connection between keyboard and computer or digital device is no longer limited to the cable connection only as the applications of computers and digital devices becomes personalized and popular in our daily life, and the environments for the applications are no longer limited to work desks or computer desks anymore, and the wireless connection can overcome the limitation of the transmission distance and range.

To meet the wireless connection requirement of a wireless keyboard, infrared and Bluetooth connection technologies are developed, wherein the infrared connection technology has drawbacks such as directional restrictions and signal hindrance, and the angle and distance of using the wireless keyboard are limited, so that the infrared technology is replaced by the Bluetooth technology gradually, and the Bluetooth technology utilizes a 2.4 GHz wireless channel to transmit and receive signals, and thus the transmission is not interfered by electromagnetic waves easily, and the wireless connection for one-to-one or one-to-many devices can be achieved, and the distance of using a Bluetooth keyboard may be up to 10 meters as long as the digital device such as a computer, a tablet PC, or a smart phone is compatible to the Bluetooth keyboard, and thus the application is very convenient.

Although Bluetooth technologies have been used extensively, the external device for receiving the keyboard signals does not support the Bluetooth technologies in some application. For example, the Bluetooth functions cannot be used before a computer enters into an operation system to start the boot-up procedure or in a system boot such as a BIOS startup procedure or a conventional DOS operating system, so that the application of the Bluetooth keyboard still has a blind sport. Therefore, a keyboard with both wireless and cable connection interface has been developed for users having the requirements of setting a BIOS menu, using a conventional DOS system, or connecting an incompatible Bluetooth digital device, so that the keyboard is applicable in different operating environments to improve the convenience of use.

However, the keyboard with both wireless and cable connection interfaces still has the following drawback: The keyboard requires a plurality of physical press keys to switch to a different output mode to connect a different external device. Obviously, the application is more complicated, and users generally need to operate or press the physical press keys by both hand.

In view of the drawbacks of the conventional keyboard, it is a main subject of the present invention to overcome the aforementioned drawbacks by providing a method of switching a keyboard with both wireless and cable connection interfaces.

SUMMARY OF THE INVENTION

Therefore, it is a primary objective of the present invention to provide a keyboard with a sensing switch function and capable of switching a cable connection mode and a wireless connection mode among a plurality of devices by different methods.

To achieve the aforementioned objective, the present invention provides a keyboard with a sensing switch function comprising a press key module, a micro control unit and a plurality of output ports, wherein the press key module comprises a plurality of press keys provided for a user to input a keyboard signal, and the micro control unit is electrically coupled to the press key module for receiving a switching signal to determine the output priority of each output port and deliver the keyboard signal, and each output port is provided for transmitting the keyboard signal via a wireless or cable transmission method, characterized in that the keyboard with a sensing switch function includes a sensing module and a display module, and the sensing module includes a plurality of light sensors for sensing a change of light to generate the switching signal, and the display module includes a plurality of indicating lamps, and the quantity of indicating lamps is equal to the quantity of output ports, and each indicating lamp is switched according to each respective output mode, and if each output port obtains the output priority, the keyboard signal is outputted from each output port to an external device.

Wherein, each output port is a cable USB transmission interface, and the output ports are a combination of one cable USB transmission interfaces and a plurality of wireless Bluetooth transmission interface. In another implementation mode, the keyboard with a sensing switch function further comprises a voice recognition module for detecting a user's voice instruction and outputting a switching signal to the micro control unit to determine which of the output ports has the output priority and output the keyboard signal from each output port to the external device. In addition, the sensing module and the voice recognition module are installed to the keyboard with a sensing switch function or externally connected to the keyboard with a sensing switch function.

With the aforementioned arrangement, the present invention has both cable and wireless output functions while providing a diversified intuitive switching method with the advantage of simple and easy operation, so as to improve the popularity of the keyboard significantly and overcome the drawbacks of the prior art.

DETAILED DESCRIPTION OF THE PREFERRED EMBODIMENTS

The aforementioned and other objectives, technical characteristics and advantages of the present invention will become apparent with the detailed description of preferred embodiments and the illustration of related drawings as follows.

Figure 1:
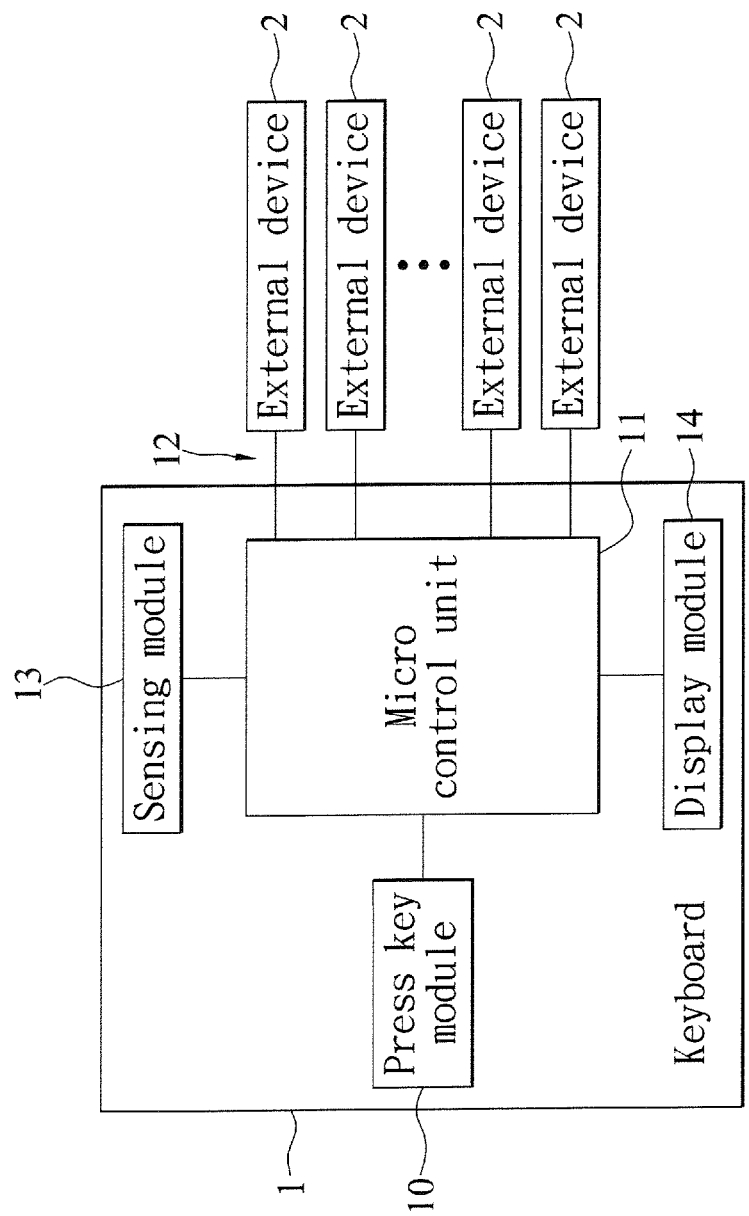
FIG. 1 is a schematic modular structural view a first implementation mode of a preferred embodiment of the present invention.
Figure 2:
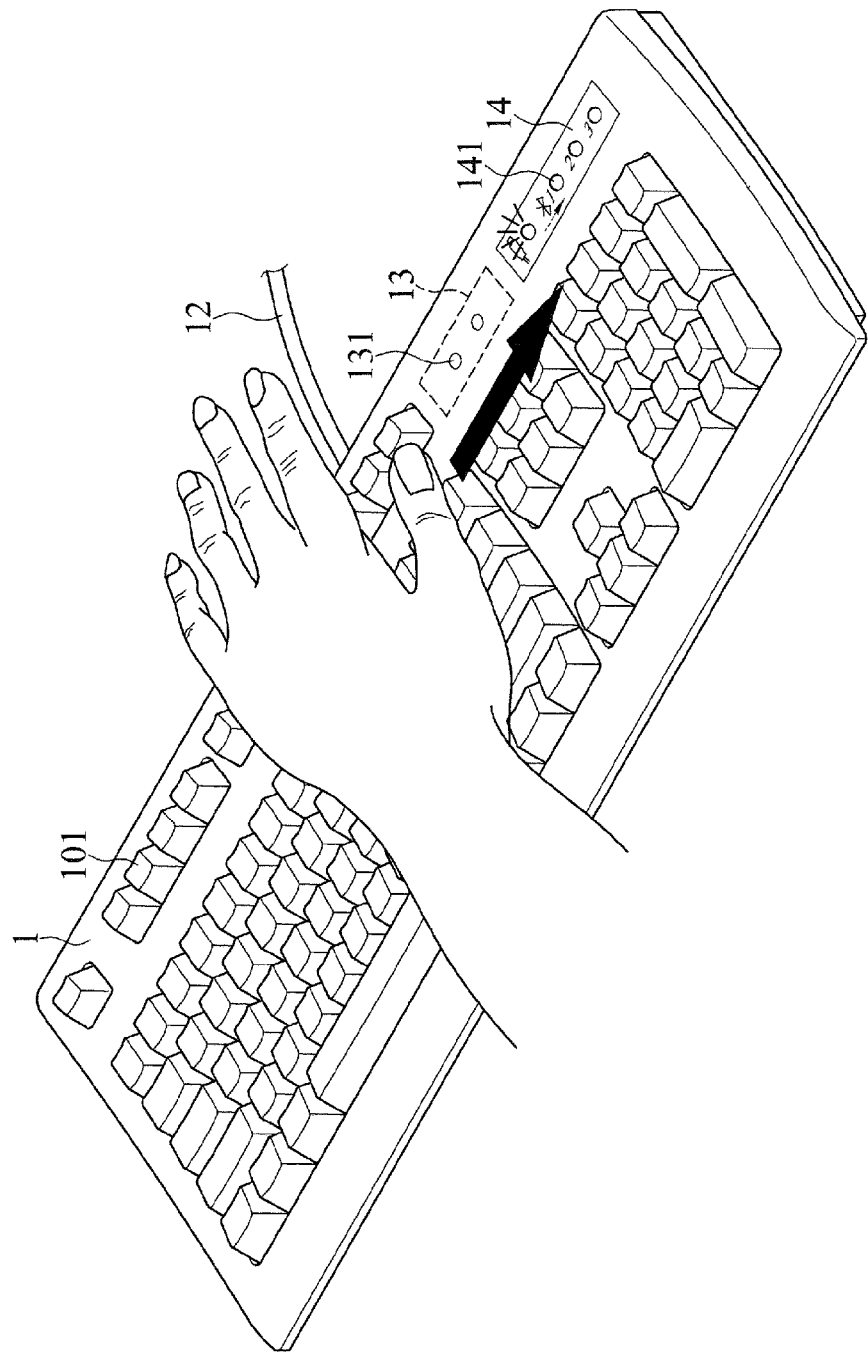
FIG. 2 is a first schematic view of an application in accordance with the first implementation mode of a preferred embodiment of the present invention.
Figure 3:
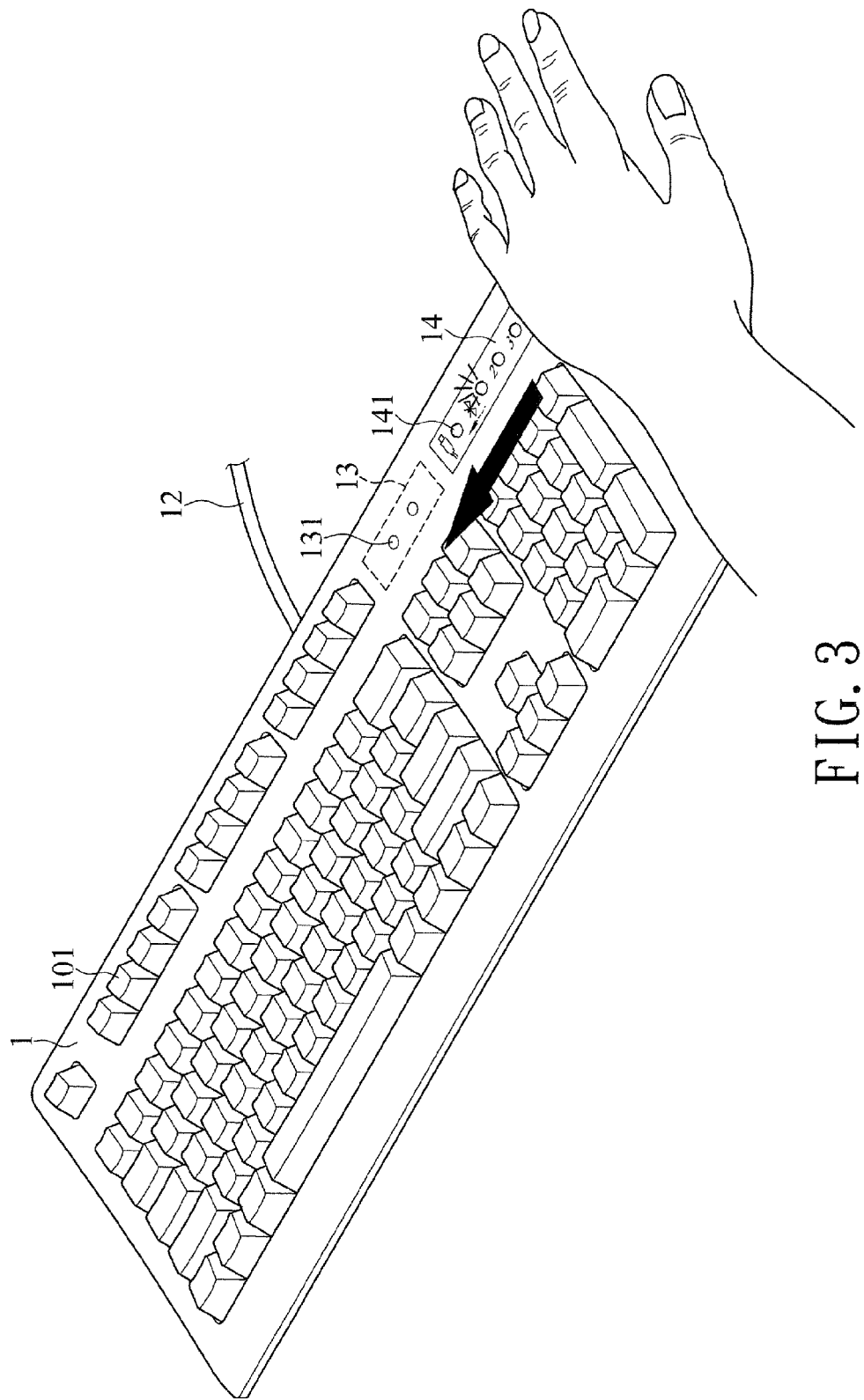
FIG. 3 is a second schematic view of an application in accordance with the first implementation mode of a preferred embodiment of the present invention.

With reference to FIGS. 1, 2 and 3 for a schematic view of a modular structure and first and second schematic views of an application of a keyboard with a sensing switch function in accordance with a first implementation mode of a preferred embodiment of the present invention respectively, the keyboard 1 comprises a press key module 10, a micro control unit 11 and a plurality of output ports 12, wherein the press key module 10 includes a plurality of press keys 101 provided for a user to input a keyboard signal, and the micro control unit 11 is electrically coupled to the press key module 10 and provided for receiving a switching signal to determine the output priority of each output port 12 and deliver the keyboard signal.

With reference to FIGS. 2 and 3 for the first and second schematic views of using the keyboard with a sensing switch function 1, the keyboard 1 further comprises a sensing module 13 and a display module 14 installed to the keyboard with a sensing switch function 1, and the sensing module 13 includes a plurality of light sensors 131 for sensing a change of light to generate a switching signal as shown in FIG. 2, wherein a user waves a hand in the direction above the sensing module 13 to generate the switching signal, so that the output priority of the output port 12 is shifted to another output port 12. In FIG. 3, the user waves a hand in another direction above the sensing module 13 to generate another switching signal to shift the output priority of the output port 12 to the other output port 12, and the light sensors 131 are devices utilizing the infrared sensing principle or light masking principle, but the present invention is not limited the devices of these two types only. When each output port 12 obtains the output priority, each output port 12 outputs the keyboard signal to an external device 2. The display module 14 includes a plurality of indicating lamps 141, wherein the quantity of the indicating lamps 141 is equal to the quantity of the output ports 12, and each indicating lamp 141 is switch according to the output mode. Wherein, the indicating lamps 141 of this implementation mode are switched according to the hand waving direction to achieve the effect of instructing the switch of the keyboard by users.

In addition, each output port 12 is not limited to a physical port, but it also can be a virtual port such as a wireless gateway, wherein the keyboard signal is transmitted via a wireless or cable transmission, and each output port 12 is a cable USB transmission interface or a wireless Bluetooth transmission interface, and the output ports 12 may be a combination of one cable USB transmission interface and a plurality of wireless Bluetooth transmission interfaces as well. In this preferred embodiment, the output port 12 includes one cable USB transmission interface and a plurality of unlimited Bluetooth transmission interfaces. After obtaining the output priority, each wireless Bluetooth transmission interface is paired with a corresponsive external device 2 via Bluetooth before outputting the keyboard signal. For the paired external device 2, the keyboard signal is outputted directly, so that the keyboard with a sensing switch function 1 has several ways of outputting the keyboard signal, so that the keyboard can be used extensively in different working environments.

Figure 4:
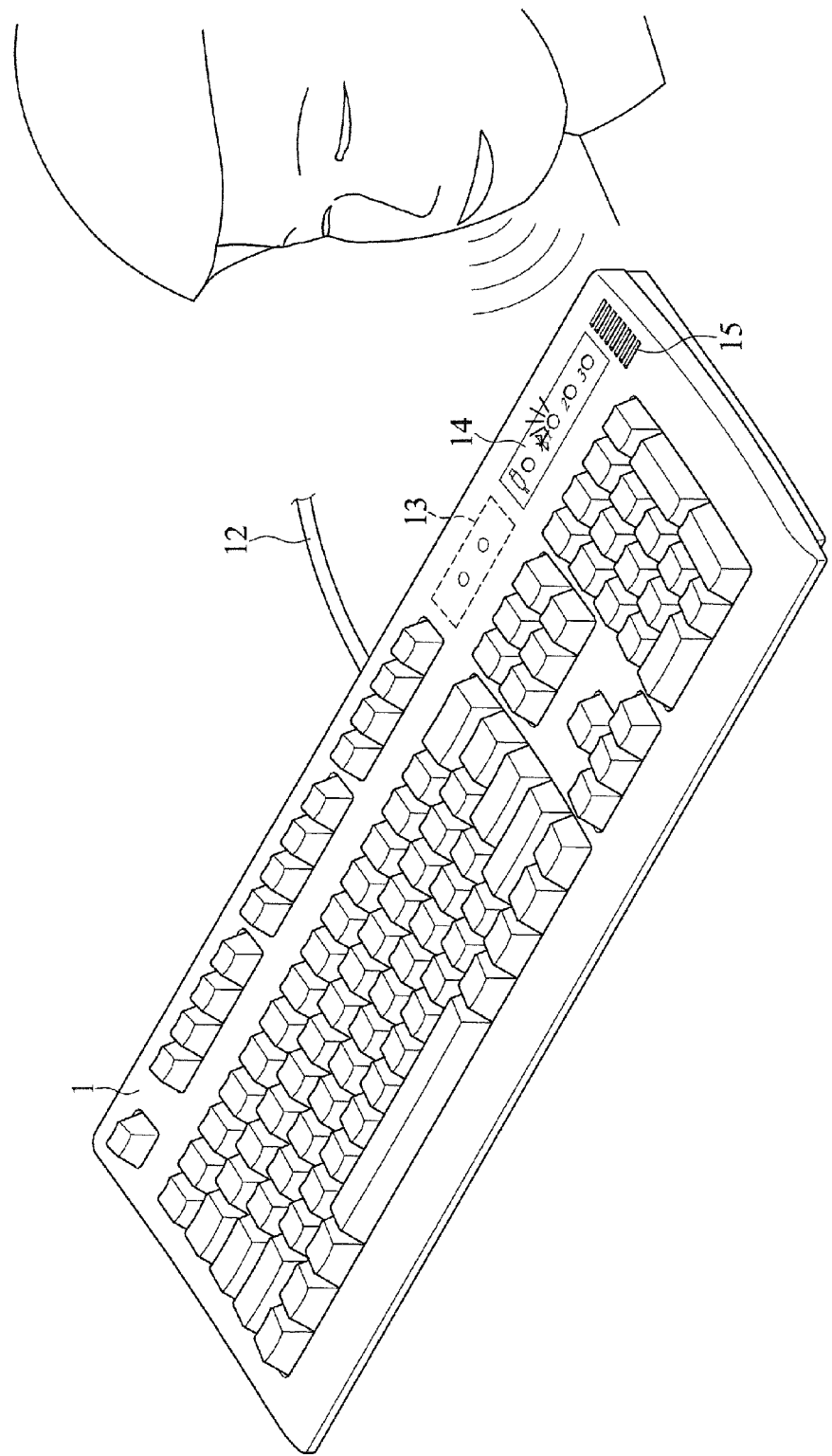
FIG. 4 is a schematic view of an application in accordance with a second implementation mode of a preferred embodiment of the present invention.

With reference to FIG. 4 for a schematic view of an application in accordance with a keyboard with a sensing switch function 1 in accordance with the second implementation mode of a preferred embodiment of the present invention, the keyboard 1 further comprises a voice recognition module 15 installed to the keyboard 1 for recognizing a user voice instruction to output the switching signal to the micro control unit 11 to determine which output port 12 has the output priority and output the keyboard signal from each output port 12 to the external device 2. The voice instruction may come with a factory default setting or set via recording by users, so that the keyboard with a sensing switch function 1 may be personalized to maximize the utility of the keyboard, wherein voices are used to replace the traditional way of switching the output mode by a press key. The present invention not just provides a convenient application only, but also takes the user-friendliness into consideration.

Figure 5:
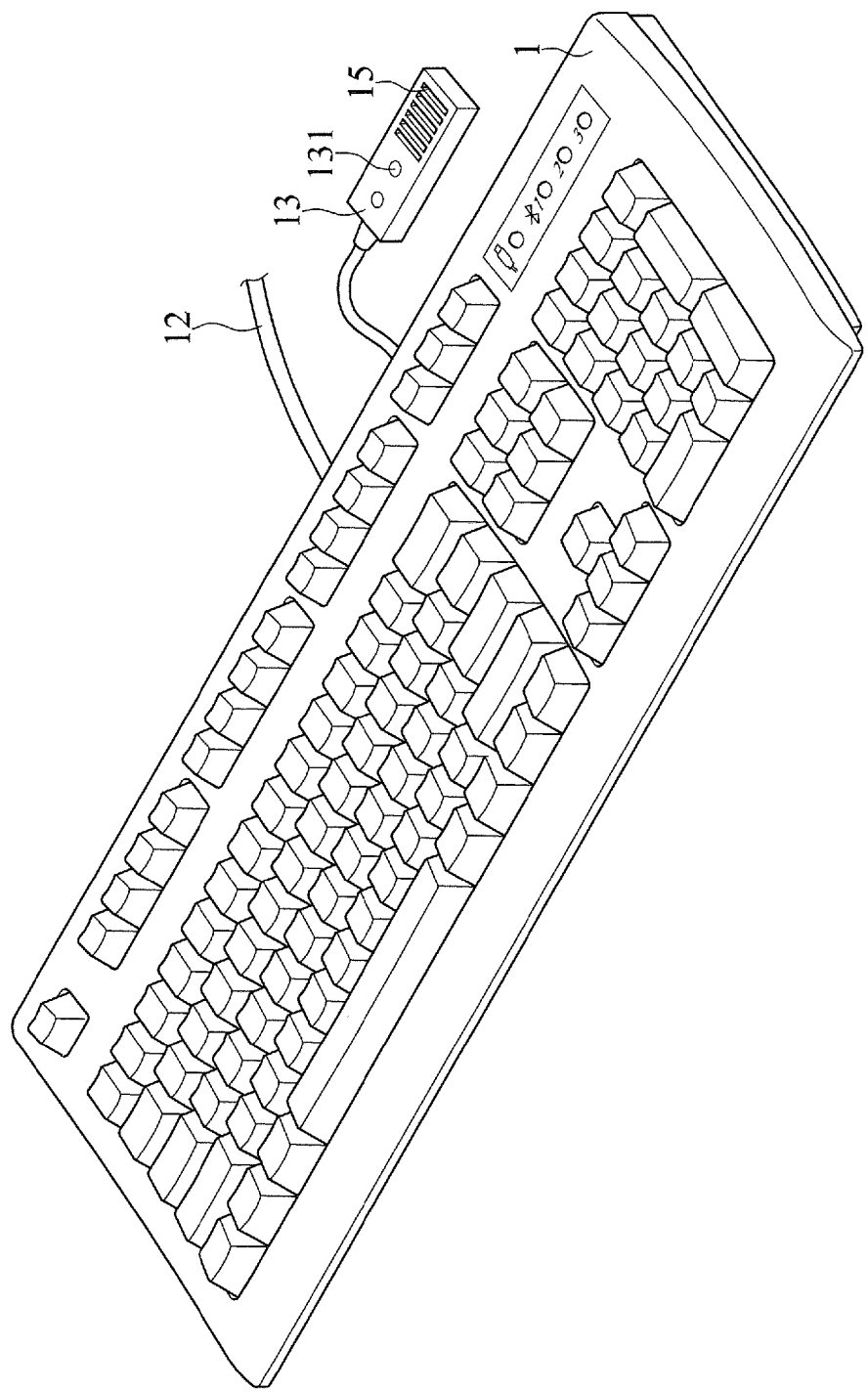
FIG. 5 is a schematic view of an application in accordance with a third implementation mode of a preferred embodiment of the present invention.

With reference to FIG. 5 for a schematic view of an application in accordance with a third implementation mode of a preferred embodiment of the present invention, this implementation mode is similar to the first and second implementation mode except that the sensing module 13 and the voice recognition module 15 are installed outside the keyboard with a sensing switch function 1 and electrically coupled to the micro control unit 11 of the keyboard 1 in this implementation mode, and such arrangements provide more options to users, so that the sensing module 13 and the voice recognition module 15 can be placed more freely to increase the using angle or change the using direction flexibly. Therefore, the keyboard with a sensing switch function 1 can be used extensively in different working environments.

What is claimed is:

1. A keyboard with a sensing switch function, comprising a press key module, a micro control unit and a plurality of output ports, wherein the press key module comprises a plurality of press keys provided for a user to input a keyboard signal, and the micro control unit is electrically coupled to the press key module for receiving a switching signal to determine an output priority of each of the output ports and deliver the keyboard signal, and each output port is provided for transmitting the keyboard signal via a wireless or cable transmission method, characterized in that the keyboard with a sensing switch function includes a sensing module and a display module, and the sensing module includes a plurality of light sensors for sensing a change of light to generate the switching signal, and the display module includes a plurality of indicating lamps, and the quantity of indicating lamps is equal to the quantity of output ports, and each indicating lamp is switched according to each respective output mode, and if each output port obtains the output priority, the keyboard signal is outputted from each output port to an external device.

2. The keyboard with a sensing switch function as claimed in claim 1, wherein each output port is a cable USB transmission interface.

3. The keyboard with a sensing switch function as claimed in claim 2, comprising a voice recognition module for outputting a switching signal to the micro control unit to determine which of the output ports has the output priority and output the keyboard signal from each output port to the external device.

4. The keyboard with a sensing switch function as claimed in claim 3, wherein the sensing module and the voice recognition module are installed to the keyboard with a sensing switch function.

5. The keyboard with a sensing switch function as claimed in claim 3, wherein the sensing module and the voice recognition module are connected externally to the keyboard with a sensing switch function.

6. The keyboard with a sensing switch function as claimed in claim 1, wherein each output port is a wireless Bluetooth transmission interface, an infrared transmission interface, or a Wi-Fi transmission interface.

7. The keyboard with a sensing switch function as claimed in claim 6, comprising a voice recognition module for outputting a switching signal to the micro control unit to determine which of the output ports has the output priority and output the keyboard signal from each output port to the external device.

8. The keyboard with a sensing switch function as claimed in claim 7, wherein the sensing module and the voice recognition module are installed to the keyboard with a sensing switch function.

9. The keyboard with a sensing switch function as claimed in claim 7, wherein the sensing module and the voice recognition module are connected externally to the keyboard with a sensing switch function.

10. The keyboard with a sensing switch function as claimed in claim 1, wherein at least one output port is a cable USB transmission interface, and at least one output port is a wireless Bluetooth transmission interface.

11. The keyboard with a sensing switch function as claimed in claim 10, comprising a voice recognition module for outputting a switching signal to the micro control unit to determine which of the output ports has the output priority and output the keyboard signal from each output port to the external device.

12. The keyboard with a sensing switch function as claimed in claim 11, wherein the sensing module and the voice recognition module are installed to the keyboard with a sensing switch function.

13. The keyboard with a sensing switch function as claimed in claim 11, wherein the sensing module and the voice recognition module are connected externally to the keyboard with a sensing switch function.

\* \* \* \* \*